D. PARKS.

MACHINE FOR CUTTING PIECED LIFTS AND FOR BUILDING HEEL BLANKS THEREFROM.

APPLICATION FILED SEPT. 13, 1916.

Reissued Dec. 5, 1916. 14,226.

3 SHEETS—SHEET 1.

Inventor
Dennis Parks.
By Bruce S. Elliott,
Atty.

THE NORRIS PETERS CO., WASHINGTON, D. C.

D. PARKS.

MACHINE FOR CUTTING PIECED LIFTS AND FOR BUILDING HEEL BLANKS THEREFROM.

APPLICATION FILED SEPT. 13, 1916.

Reissued Dec. 5, 1916. 14,226.

3 SHEETS—SHEET 2.

Inventor
Dennis Parks.
By Bruce A. Elliott,
Atty.

THE NORRIS PETERS CO., WASHINGTON, D.C.

D. PARKS.

MACHINE FOR CUTTING PIECED LIFTS AND FOR BUILDING HEEL BLANKS THEREFROM.

APPLICATION FILED SEPT. 13, 1916.

Reissued Dec. 5, 1916.

14,226.

3 SHEETS—SHEET 3.

Inventor
Dennis Parks.
By Bruce A. Elliott,
Atty.

THE NORRIS PETERS CO., WASHINGTON, D. C.

UNITED STATES PATENT OFFICE.

DENNIS PARKS, OF ST. LOUIS, MISSOURI.

MACHINE FOR CUTTING PIECED LIFTS AND FOR BUILDING HEEL-BLANKS THEREFROM.

14,226. Specification of Reissued Letters Patent. Reissued Dec. 5, 1916.

Original No. 1,167,107, dated January 4, 1916, Serial No. 31,371, filed June 1, 1915. Application for reissue filed September 13, 1916. Serial No. 119,994.

*To all whom it may concern:*

Be it known that I, DENNIS PARKS, a citizen of the United States, residing in the city of St. Louis and State of Missouri, have invented new and useful Improvements in Machines for Cutting Pieced Lifts and for Building Heel-Blanks Therefrom, of which the following is a specification.

This invention relates to the art of heel building, and has for its general object to provide a novel machine for cutting pieced lifts and for building heel blanks therefrom in a continuous operation.

Stated in detail, the objects of the invention are, to provide novel means for cutting assembled pieces of leather into the form of a lift and simultaneously forcing the pieced lift thus formed into a holder; to provide, in combination with a reciprocating member, an independently-movable member carrying a cutting block and automatic means for effecting engagement between said reciprocating and movable members to actuate the cutting block, and for effecting disengagement of said members after a single actuation of the cutting block; and to provide novel means for indicating the thickness of each lift cut and forced into the holder and thereby to determine when each heel-blank has been built up to the proper height.

Still further objects of the invention relate to subsidiary operations involved in the accomplishment of the foregoing objects, to details of construction, and to combinations and coöperations of parts, as will hereinafter more clearly appear.

Figure 1:
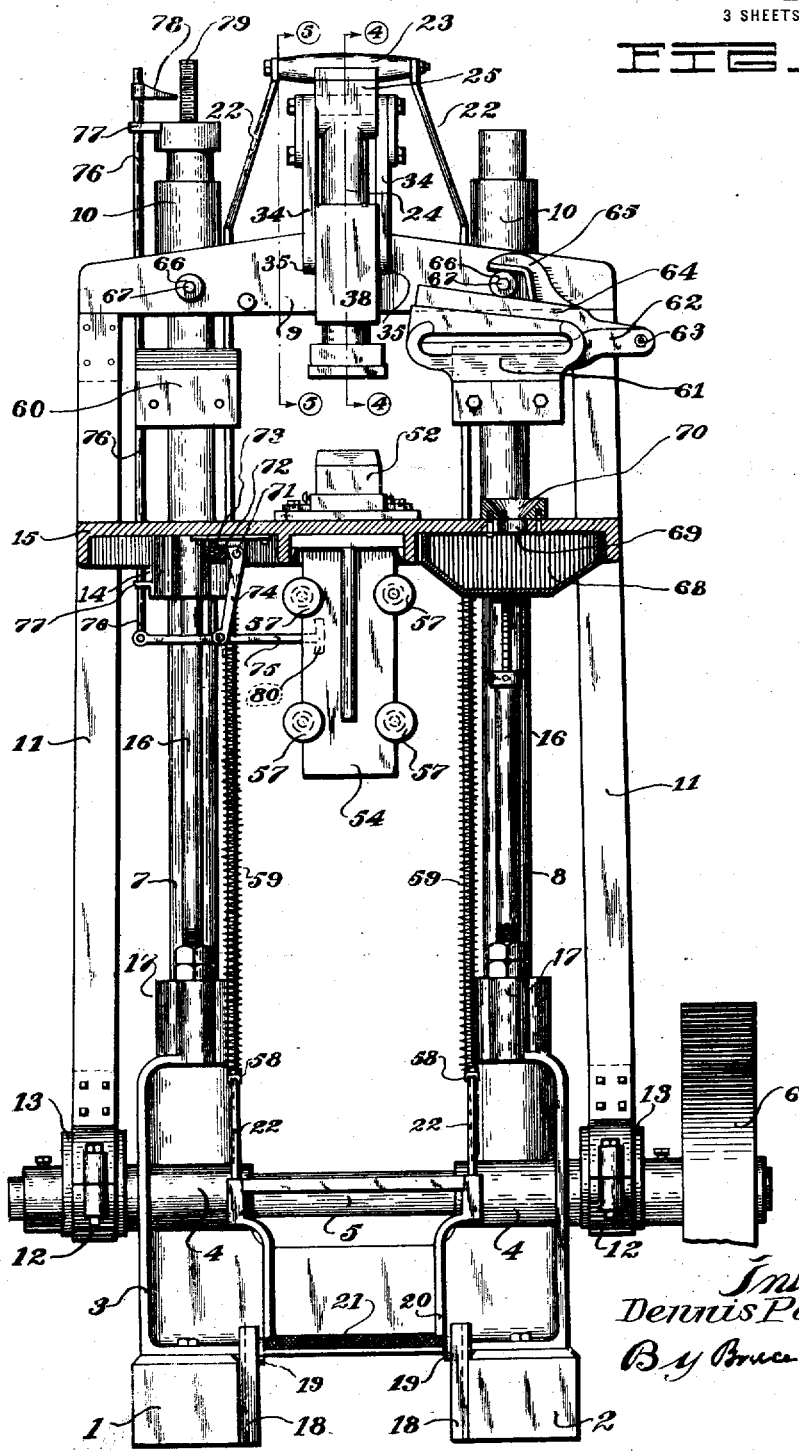
Figure 2:
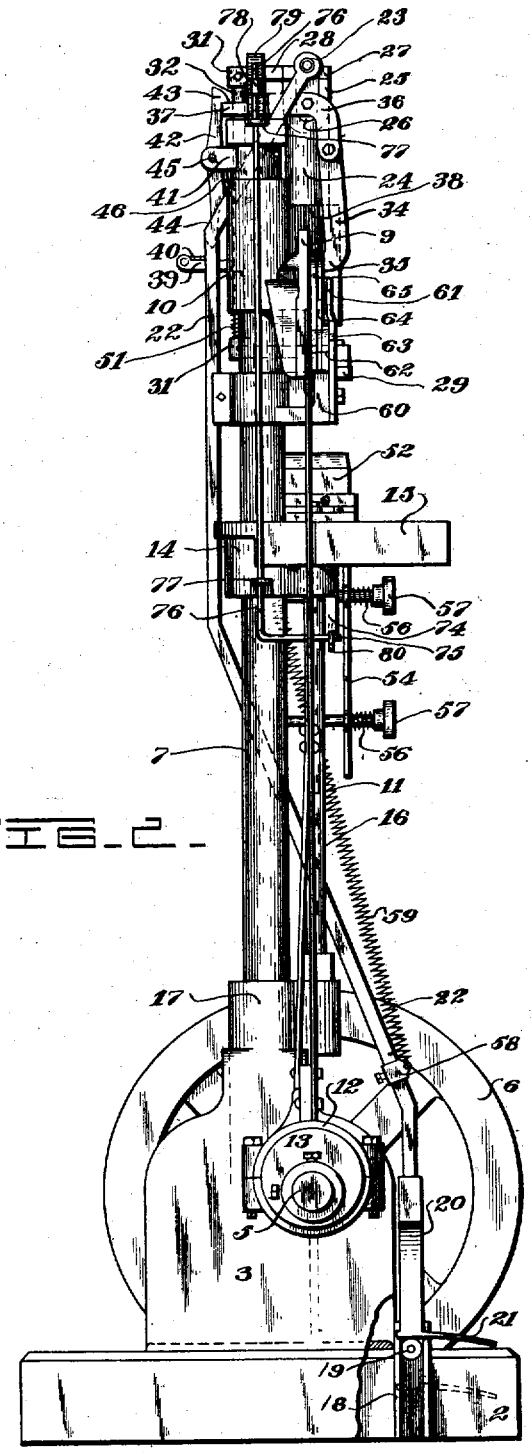
Figure 5:
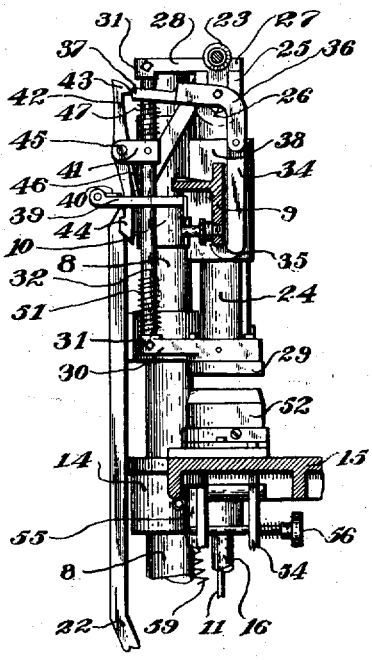
Figure 4:
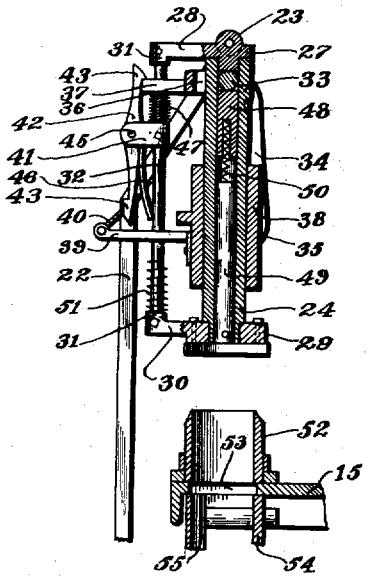
Figure 6:
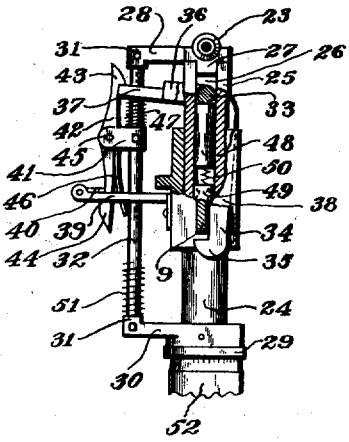
Figure 3:
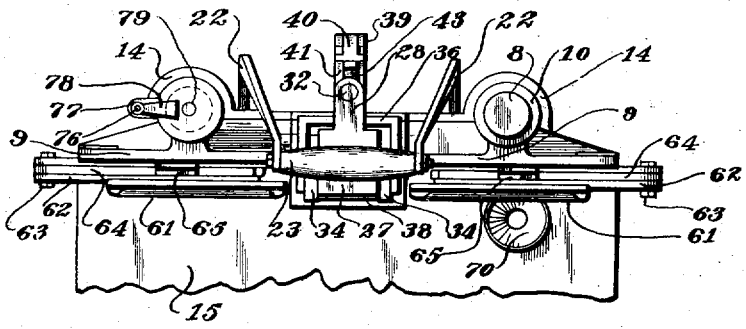

Referring now to the drawings,—Figure 1 is a view partly in front elevation and partly in section of a machine constructed according to my invention, one of the cutters, that at the left of the machine, being removed; Fig. 2 is a view in side elevation thereof, a portion of the base being broken away to illustrate the construction more clearly; Fig. 3 is a plan view of the machine, part of the work table being broken away; Fig. 4 is a section on the line 4—4 of Fig. 1; Fig. 5 is a section on the line 5—5 of Fig. 1, but showing the cutting block depressed and the actuating dogs in engagement therewith; and Fig. 6 is a view partly on the line 4—4 and partly on the line 5—5 of Fig. 1, but showing the position of the parts after the cutting block has been depressed and the cross head raised out of engagement with the catches.

In the drawings, the numerals 1, 2, indicate two base members, on which is supported a frame 3. Journaled in suitable bearings 4 on opposite sides of the frame is a shaft 5 provided with a pulley 6 by means of which the machine is driven by a suitable belt, as usual. Mounted in and extending upward from opposite sides of the frame 3 are two columns 7 and 8.

The numeral 9 indicates a cross head which is provided with bearings 10 slidably mounted on the upper end portions of the columns 7 and 8. At either end the cross head 9 has secured to it the upper ends of connecting rods 11, the lower ends of which are provided with rings 12 surrounding eccentrics 13 mounted near opposite ends of the shaft 5. Secured on the columns 7 and 8 are supports 14 on which is mounted a table 15, the supports 14 being braced by posts 16 extending between them and similar supports 17 provided on the frame 3. The numerals 18 (Figs. 1 and 2) indicate two similar vertically-disposed guides mounted on the inner sides of the respective base members 1 and 2, in which work rollers 19 provided on the bottom and at opposite sides of a treadle frame 20, having a foot piece 21. Secured at their lower ends to opposite sides of the treadle frame 20 are pull-bars 22, the upper ends of which are connected by a cross piece 23. Slidably mounted in the cross head 9 and centrally thereof, is a vertically-disposed plunger 24, the upper end of which is provided with a rectangular head 25. The plunger 24 is hollow, and the head 25 thereof is provided at opposite sides with a slot 26, the top of the head 25 having secured thereon a stop block 27 to which is secured the cross piece 23 before referred to. Extending rearward from the stop block 27 is an arm 28.

Mounted on the lower end of the plunger 24 is a cutting block 29, extending rearward from which is an arm 30. The arms 28 and 30 are provided at their free ends with socket members 31 in which are secured the opposite ends of a rod 32. Pivotally and slidably mounted in the slots 26 of the head 25 is a cross pin 33 to which are secured at opposite ends the upper ends of two catches 34, each of which is provided at its lower end with a hook 35.

The numeral 36 (Figs. 3, 5 and 6) indicates a U-shaped bail, the legs of which are secured to the sides of the respective catches 34. Extending rearward from the central portion of the bail 36 is a tongue 37 which is provided with an elongated aperture loosely surrounding the rod 32. The cross head 9 is provided centrally of its length with a rectangular portion or guide 38 in which is provided a bearing for the plunger 24. The catches 34 slidably engage opposite sides of the guide 38. Secured on and extending rearward from the guide 38 is a bracket 39 having pivotally mounted in its outer end a latch 40 which normally rests upon the upper surface of the bracket but is freely movable in an upward direction.

The numeral 41 indicates a U-shaped clip which is secured on the rod 32 and has pivotally mounted between its free ends a double dog 42 having an inward-directed hook 43 at its upper end and an outward-directed hook 44 at its lower end, and double dog being pivotally mounted about centrally of its length, as indicated at 45. A leaf-spring 46 mounted in the clip 41 and bearing at its free end against the rod 32, tends normally to force the lower end portion of the dog 42 outward and to hold the hook 43 at its upper end in engagement with the arm 37 of the bail 36. In its normal position the lower hooked end 44 of the dog 42 occupies a position above the latch 40, as indicated in Fig. 2. The bracket 39 is slotted to permit the passage therethrough of the rod 32 and the lower portion of the spring 46 and dog 42. Interposed between the clip 41 and the arm 37 is a coil spring 47 which is normally under compression so that it will operate to force the arm 37 upward and thereby move the catches 34 inward or toward the cross head when the hook 43 of the double dog 42 is released from engagement with said arm 37. Slidably mounted in the plunger 24 is a lift pin 48. Extending upward into the plunger 24 is a rod 49 and a coil spring 50, the upper portion of which is housed in the lift pin 48, extends between the upper end of the bar 49 and said lift pin and tends normally to force the upper end of the latter against the cross pin 33 to lift the same and thereby raise the catches 34. A buffer spring 51 encircles the lower end portion of the rod 32, being supported on the socket 31, and is adapted to engage the under side of the bracket 39 in the upward movement of the plunger 24, as presently referred to.

Mounted on the work table 15 is a die 52 which is immediately under the cutting block 29. An opening 53 is provided through the table and arranged about opposite sides of this opening, and extending downward therefrom, is a holder for receiving the lifts cut and forced down through the die 52, said holder comprising a breast-plate 54 and a back-plate 55, the breast-plate 54 being held in yieldable relation with the back-plate 55 by means of springs 56 interposed between said plate and the heads of the hand screws 57, by turning which screws the proper adjustment of the breast-plate with reference to the back-plate may be secured. This holder is fully described in connection with a machine having the same general object in view as the present invention and forming the subject-matter of an application for patent, Ser. No. 879,858, filed December 31st, 1914, by William Wolfe and myself as joint inventors.

Connected at its lower end to the lower end portion of each pull rod 22, as indicated at 58, Fig. 2, is a coil spring 59, the upper ends of said coil springs being secured to the respective supports 14. These springs operate to raise the treadle member 20 after it has been depressed, and consequently to raise the plunger 24 when pressure on the foot piece 21 is released. Mounted on each of the columns 7, 8, is a fixed cutter 60, shown at the left of Fig. 1, and secured to this cutter is a guard 61, shown at the right of Fig. 1, having an arm 62 on which is pivotally mounted at 63 one end of a blade 64. Each blade 64 has projecting from its upper side a bracket arm 65 which engages over a roller 66 mounted on a stud 67 on the cross head 9. Supported on the under side of the work table 15 at the right-hand side thereof, is a paste-pot 68, the table being provided with an aperture 69 communicating with the paste-pot. Secured on the table 15 over this opening is a suitable mouth-piece 70 having a tapered opening leading to the opening 69 to permit ready entrance of a brush to the paste-pot and the return of excess paste carried up by the brush to the paste-pot.

The operation of the device as thus far described is as follows: As the shaft 5 revolves the eccentrics 13 cause the reciprocation of the cross head 9. This movement of the cross head, in turn, causes a reciprocatory movement of the blades 64. The operator will have a quantity of scrap leather on the work table 15, and selecting pieces of this leather, he inserts them in the cutters to give them a straight edge. These pieces are assembled on top of the die 52, and usually a third piece of leather has a straight edge cut thereon and is placed on top of the die. The operator then presses down on the foot piece 21 which, through the medium of the pull rods 22, lowers the plunger 24 and the parts connected to or mounted thereon. As the plunger descends, the first operation which occurs is the contact of the hook 44 of the double dog 42 with the latch 40. In this movement the lower end of said double dog will be pressed inward as the hook 44 passes by the latch 40, and the hook 43 will be drawn out of engagement with the arm 37. This position of the parts is shown in Fig. 5. As soon as the arm 37 is released the spring 47 is free to exert its power to move said arm upward. As the plunger 24 is lowered the catches 34 are lowered with it, until their hooks 35 will be below the lower edge of the cross head 9 when the latter is at the limit of its upward movement. As soon thereafter as the cross head 9 passes upward a sufficient distance to clear the hooks 35, the spring 47 will at once throw the arm 37 upward and force the hooks 35 under the lower edge of the cross head 9, this position of the parts being shown in Fig. 5. As the cross head descends it will carry the catches 34 down with it drawing down the cross pin 33 to the bottom of the slot 26, which then causes the plunger 24 to be drawn down, to carry the cutting block 29 into engagement with the top of the die 52, in which operation the leather pieces on top of said die, will be cut through by the die, the excess falling off and the three-pieced lift remaining in the die. In the downward movement of the catches 34, the cross pin 33 pushes downward the slide pin 48 against the resistance of the spring 50. As the catches 34 and plunger 24 are thus drawn downward by the cross head 9, the arm 37 will be moved below the hook 43, which will immediately snap over the end of said arm, this position of the parts being shown in Fig. 6. The cross head 9 being continuously reciprocated, as soon as it has drawn the catches 34 downward immediately thereafter raises out of contact with the hooks 35, which position is also shown in Fig. 6, and the spring 50 simultaneously forces the slide-pin 48 upward forcing cross-pin 33 into engagement with the stop block 27, thereby throwing the catches 34 outward and moving their hooks 35 from under the lower edge of the cross head 9. Should the operator inadvertently hold the foot piece 21 depressed no harm will be done as the cross head 9 will simply continue to reciprocate without engaging the hooks 35. As soon as the operator releases pressure on the foot piece 21, however, the springs 59 draw the pull bars upward, thereby raising the plunger 24 and carrying the double dog 42 upward, in which movement the hook 44 engages the under side of the latch 40 and raises the same as shown in Fig. 4, and after passing above the said latch will fall to its normal position, or to that shown in Fig. 2.

One of the principal advantages of the foregoing arrangement is that any object only slightly thicker than a lift, if inserted under the cutting block, will prevent the plunger 24 being lowered sufficiently to permit the hooks 35 to engage under the cross head 9. Should, therefore, the operator inadvertently insert his finger between the die and the cutting block he would incur no greater injury at best than a hard squeeze or perhaps a slight cut on the finger, dependent on the pressure applied to the foot piece 21. His safety in this regard is further secured by the fact that after one impact of the cutting block with the die the hooks 34 are automatically released from engagement with the cross head 9, and prevent a second downward movement of the cutting block, so that there is no possibility of the cutting block descending on the die except at such times as the operator causes this to take place by pressing down the foot piece 21. And after having once pressed down the foot piece he is compelled to release it and permit the plunger 24 to rise to reset the catch mechanism above described before the cutting block can again be made to descend into contact with the die.

Lifts are continued to be cut in the manner above described until a number forming a heel-blank of the desired height have been pressed down in the die when the building of a new heel-blank commences, the former heel-blank being gradually forced downward into the holder formed by the breast-plate 54 and back-plate 55. Suitable means of separating the heel-blanks are employed.

The operation of building the heel-blanks need not be referred to at more length, as it is described in the application of Wolfe and Parks above referred to, and also in Letters-Patent granted to William Wolfe and myself for a method of building heel-blanks, No. 1,157,355, dated October 19th, 1915.

In order for the operator to determine the thickness of the lift cut, and also to enable him to build heel-blanks of uniform height, I employ the gage mechanism which will now be described.

Pivotally mounted on the under side of the work table 15 (Fig. 1) is a bell crank lever 71 having a short arm 72 normally pressed downward by a spring 73, and a relatively long arm 74 pivotally connected at its lower end intermediate the ends of a lever arm 75. The latter is pivotally connected at its outer end to the lower end of a vertically-disposed rod 76 which passes upward through suitable bearings 77 provided on the column 7, and has at its upper end a pointer 78. The column 7 has secured on its upper end a vertically-disposed gage 79 having suitable graduation marks thereon. The lever arm 75 has a free end extending inward between the plates 54 and 55, and such free end is provided with a curved shoe 80 which is in a position to be engaged by the lifts or heel-blanks as they are forced downward in the holder. It will be seen that as each heel-blank moves down in the holder it will carry the curved shoe 80 with it and raise the outer end of the lever arm 75 which, in turn, will raise the rod 76 and pointer 78. As the end of the latter lies in juxtaposition to the scale on the gage 79, the operator, by observing the latter, can see the thickness of the lift that has been cut, and as he knows the height to which the heel-blank is to be built he will not only be able to ascertain when this desired height has been reached by observing the scale, but he will also be assisted in selecting the proper thickness of leather to be used in cutting the last lift, or the last two lifts, in order to bring the height of the heel-blank to the desired standard.

I claim:

1. In a machine of the class described, in combination with a die, a reciprocable member, an independently-movable member carrying a cutting block, means for automatically effecting engagement between said reciprocable and movable members when the latter has been moved a predetermined distance whereby the cutting block may be carried into contact with the die by the reciprocable member, and coöperating means for automatically releasing such engagement after a single impact of the cutting block with the die.

2. In a machine of the class described, in combination with a die, a reciprocable member, an independently-movable member carrying a cutting block, means for automatically effecting locking engagement between said reciprocable and movable members when the latter has been moved a predetermined distance whereby to cause the cutting block to be carried into contact with the die by the movement of the reciprocable member, and coöperating means for automatically releasing such engagement after a single impact of the cutting block with the die.

3. In a machine of the class described, in combination with a die, a reciprocable member, a depressible member carrying a cutting block, means for automatically effecting engagement between said depressible and reciprocable members when the former has been lowered a predetermined distance, to cause the cutting block to be carried into contact with the die by the reciprocable member, and coöperating means for automatically releasing such engagement after a single impact of the cutting block with the die.

4. In a machine of the class described, in combination with a die, a continuously reciprocable member, a manually depressible member carrying a cutting block, means for automatically effecting engagement between said depressible and reciprocable members when the former has been lowered a predetermined distance, to cause the cutting block to be carried into contact with the die by the reciprocable member, and coöperating means for automatically releasing such engagement after a single impact of the cutting block with the die.

5. In a machine of the class described, in combination with a die, a reciprocable member, a depressible member carrying a cutting block adapted to coöperate with said die, and automatic mechanism carried by one of said members and adapted to be actuated in the descent of said depressible member to effect engagement of the latter with said reciprocable member in the downward movement thereof to cause the cutting block to be carried into contact with the die, and to be released from such engagement in the following upward movement of said reciprocable member.

6. In a machine of the class described, in combination with a die, a continuously reciprocable member, a depressible member carrying a cutting block adapted to coöperate with said die, and automatic mechanism carried by said depressible member and adapted to be actuated in the descent thereof to effect engagement of said depressible member with said reciprocable member in a downward movement thereof, to cause the cutting block to be carried into contact with the die, and to be released from such engagement in the following upward movement of said reciprocable member.

7. In a machine of the class described, in combination with a die, a continuously reciprocable member, a manually depressible member carrying a cutting block, and automatic catch mechanism carried by said depressible member and adapted to be actuated in the descent of said depressible member to effect engagement of said depressible member with said reciprocable member in a downward movement thereof to cause the cutting block to be carried into contact with the die, and to be released from such engagement in the following upward movement of said reciprocable member.

8. In a machine of the class described, in combination with a die, a continuously reciprocable member, a depressible member carrying a cutting block, and automatic catch mechanism carried by said depressible member and adapted to be actuated in the descent of said depressible member to effect engagement of said depressible member with said reciprocable member in a downward movement thereof, to cause the cutting block to be carried into contact with the die, and to be released from such engagement in the following upward movement of said reciprocable member and be maintained in such released position until said depressible member is again raised and depressed.

9. In a machine of the class described, in combination with a die, a continuously reciprocable member, a depressible member carrying a cutting block adapted to cooperate with said die, a spring-controlled catch pivotally mounted on said depressible member, a dog movable with said depressible member and normally engaging said catch to hold it out of the path of movement of said depressible member, means for automatically releasing said dog from engagement with the catch in the downward movement of the depressible member to permit said catch to be thrown into engagement with said reciprocable member to cause the cutting block to be carried into contact with the die in a downward movement of the latter member, a spring operating to throw said dog into engagement with said catch while the cutting block is in its lowermost position, and automatic means operating to move said catch out of the path of movement of said reciprocable member in the following upward movement thereof.

10. In a machine of the class described, in combination with a die, a continuously reciprocable member, a depressible member carrying a cutting block adapted to cooperate with said die, a spring-cotrolled catch pivotally mounted, and having a limited slidable movement in, said depressible member, a dog movable with said depressible member and normally engaging said catch to hold it out of the path of movement of said reciprocable member, means for automatically releasing said dog from engagement with the catch in a downward movement of the depressible member to permit said catch to be thrown into engagement with said reciprocable member to cause the cutting block to be carried into contact with the die, a spring operating to throw said dog into engagement with said catch while the cutting block is in its lowermost position, and automatic means operating to raise said catch and simultaneously move it out of the path of movement of said reciprocable member in the following upward movement thereof.

11. In a machine of the class described, in combination with a die, a continuously reciprocable member, a depressible member carrying a cutting block adapted to cooperate with said die, a spring-controlled catch pivotally mounted, and having a limited slidable movement in, said depressible member, a spring normally holding the pivot of said catch in its uppermost position, a dog movable with said depressible member and normally engaging said catch to hold it out of the path of movement of said reciprocable member, a latch adapted to be engaged by said dog in its downward movement to turn the dog out of engagement with said catch to permit it to be thrown into engagement with said reciprocable member in a downward movement thereof to cause the cutting block to be carried into contact with the die, a spring operating to throw said dog into engagement with said catch while the cutting block is in its lowermost position whereby, in the following upward movement of said reciprocable member, the pivot of said catch will be thrown upward by its spring to raise said catch and simultaneously move it out of the path of movement of said reciprocable member.

12. In a machine of the class described, in combination with a die, a continuously reciprocable member, a depressible member mounted on said reciprocable member and movable independent thereof, a catch carried by said depressible member and movable with and also independent therof, and automatic means adapted to throw said catch into the path of movement of said reciprocable member in the downward movement of said depressible member, whereby said reciprocable member in a downward movement will engage the catch and carry the cutting block into engagement with the die, and coöperating means operating in the following upward movement of said reciprocable member to move said catch out of the path of movement of said reciprocable member.

13. In a machine of the class described, in combination with a die, a continuously reciprocable member, a depressible head, a depressible member mounted in said head and movable independent thereof, said member having a vertically-disposed slot in its upper end, a catch having a pivot slidably mounted in said slot and spring-supported above the bottom thereof, a spring tending normally to throw said catch across the path of movement of said head, a dog normally holding said catch out of said latter position, and means operating on the depression of said member to release said dog from its engagement with the catch to permit the latter to spring under said head whereby, in a downward movement of the latter, it will engage the catch and draw its pivot into engagement with the bottom of said slot and thereby further depress said member to carry the cutting block into engagement with said die, and simultaneously move the catch into engagement with said dog, so that, in the following upward movement of said head, the pivot of said catch will be raised by its spring to the upper part of said slot to raise said catch and turn it out of the path of movement of said head.

14. In a machine of the class described, in combination with a die, a continuously reciprocable member, a plunger slidably mounted in said depressible member and carrying a cutting block adapted to coöperate with said die, spring-controlled pull-rods connected to said plunger, a treadle member carried by said pull-rods and adapted to be depressed to lower said plunger, and automatic mechanism carried by said depressible member and adapted to be actuated in the descent of said plunger to effect engagement of said depressible member with said reciprocable member in a downward movement of the latter to cause the cutting block to be carried into contact with the die, to be relased from such engagement in the following upward movement of said reciprocable member, and to be reset by the upward movement of said plunger when the treadle member is released.

15. In a machine of the class described, in combination with a holder and means for continuously cutting and forcing lifts downwardly therein, a spring-pressed pivotally-supported arm having at one end a contact member lying in the path of movement of said lifts, a movable rod secured to the other end of said arm and carrying a pointer, and a scale mounted on the machine in coöperative relation with said pointer.

16. In a machine of the class described, in combination with a holder and means for continuously cutting and forcing lifts downward therein, a bell crank lever pivotally mounted on said machine, a spring normally acting on one member of said lever to force the other member toward the holder, an arm pivotally mounted intermediate its ends on said latter member and having a free end provided with a contact member lying in the path of movement of said lifts, a movable rod connected to the other end of said arm and carrying a pointer, and a scale mounted on the machine in coöperative relation with said pointer.

In testimony whereof, I have hereunto set my hand.

DENNIS PARKS.

Copies of this patent may be obtained for five cents each, by addressing the "Commissioner of Patents, Washington, D. C."